Patented Jan. 8, 1929.

1,698,654

UNITED STATES PATENT OFFICE.

WALTER RAUTENSTRAUCH, OF PALISADE, NEW JERSEY, ASSIGNOR TO METALASTIC INC., OF JERSEY CITY, NEW JERSEY, A CORPORATION OF NEW JERSEY.

PACKING.

No Drawing.   Application filed September 11, 1923.   Serial No. 662,155.

This invention relates to packing for use under a variety of conditions and is particularly adapted to be used in sealing joints and connections which are subjected to extremely high temperature, such for example, as is incident to superheated steam used as an impelling fluid in steam turbines.

The packing comprises an intermixture of relatively small particles of metal, specifically copper; fiber, specifically asbestos, to which may be added an organic fiber, specifically flax; grease or oil, specifically tallow; and a solid lubricant, specifically graphite. These ingredients may be mixed together in the proportions and in the manner hereinafter more particularly stated. The solid lubricant which I prefer to use is graphite and for the sake of simplicity I shall employ that term throughout the description and claims, but it is to be understood by the use of that term I intend to cover equivalents thereof.

The metal should be one having a high melting point, such as copper, and should be finely divided, as for example, in the form of chips, preferably not larger than 5 mm. in length, 3 mm. in width, and 0.5 mm. in thickness, and diminishing to pulverized form.

The flax, in the form of fiber or shreds, may vary from 3 mm. in length to 0.25 mm. in diameter, to about 7 mm. in length and 1.5 mm. in diameter. These dimensions are not given as being essential but have been found satisfactory. The flax has been found useful as a binder to facilitate the handling of the composition, although it may burn out once the material has been placed in use, leaving the heat resisting fiber as a permanent binder.

Mapleleaf Crude and Fibre Corporation A T asbestos has been found satisfactory, it being in the form of shreds or fibers and varying from about 3 mm. in length and 0.25 mm. in diameter to about 7 mm. in length and 1.5 mm. in diameter.

Tallow, preferably a tri-stearin, containing not more than 0.5% of fatty acid, has been found satisfactory at extremely high temperatures inasmuch as the tallow is relatively stable under such conditions, having a high melting point.

It has been found that Dixon's No. 2 flake graphite, in finely divided comminuted form, proves very satisfactory as the graphite component.

The preferred proportions in which the components are mixed are as follows, the proportions being given by weight:

|  | Per cent. |
|---|---|
| Copper | 65 |
| Flax | 2 |
| Asbestos | 6 |
| Tallow | 12 |
| Graphite | 15 |

A satisfactory packing using the above mentioned components in the proportions stated was made in the following manner:

Commercial copper was reduced to chips, as by means of a milling machine, and the chips so derived were mixed at about 220° F., with about one-half of the required amount of graphite in a steam-jacketed dough-mixing machine, employing oppositely rotating agitating or stirring arms, rotating on horizontal axes. After having thoroughly mixed the copper and this graphite and without discontinuing the operation of the mixing machine, the required amounts of asbestos and flax respectively were slowly added and distributed throughout the mass. Stirring was continued and the tallow, reduced to melted form, was added, after which the remaining amount of graphite required to make up the 15% of such was introduced, the stirring or mixing being thereafter carried out upon the whole mass for a period of about five minutes. Just before the completion of the mixing operation about 10 cc. of benzaldehyde per one hundred pounds of the mixture were added which served as a deodorant, and also as a preservative of the tallow, which is subjected to breaking down or decomposition, particularly under the high temperatures for which the packing is designed.

The packing compounded according to the above described process and employing the given proportions of components was found to operate successfully, meet the severe requirements and withstand the extreme conditions incident to the steam turbine work for which this form of the composition was specially prepared.

Having thus described my invention, I claim:

1. A packing comprising an intermixture of metallic particles having a high melting point, graphite, tallow, a fibrous material adapted to remain stable when the packing is subjected to heat, and a fibrous material adapted to burn out when the packing is subjected to heat.

2. A packing comprising an intermixture of metallic particles having a high melting point, fibrous material, tallow, graphite and a relatively small quantity of benzaldehyde.

3. A packing adapted to be used under high temperature conditions comprising a mixture of particles of metal having a high melting point, a heat resisting fibrous material, a lubricant relatively stable at high temperatures, a fibrous material adapted to burn out when the packing is subjected to heat, and graphite.

4. A packing adapted to be subjected to high temperatures, and comprising a binder holding together the packing during installation but burning out after installation and a heat-resisting fibrous material.

5. A packing comprising a mixture of particles of copper, a heat resisting fibrous material, a fibrous material adapted to burn out when the packing is subjected to heat, a lubricant with a high boiling point, and graphite.

6. A packing comprising about 65% particles of copper and also comprising a heat resisting fibrous material, a lubricant relatively stable at high temperatures, and graphite.

7. A packing comprising about 65% copper, about 8% fibrous material, about 12% tallow, and about 15% graphite.

8. A packing comprising about 65% copper, about 8% fibrous material, about 12% tallow, and about 15% graphite, said fibrous material comprising asbestos and another fiber forming a binder but adapted to burn out under high temperatures.

9. The method of making a packing which comprises mixing copper particles and a portion of the amount of graphite to be incorporated, adding the fibrous material while still mixing, pouring in melted tallow, and then adding the remaining amount of graphite.

10. A packing adapted to be used under conditions of extremely high temperature comprising metallic particles having a high melting point, graphite, tallow, flax, asbestos fibers, and benzaldehyde.

11. The method of making a packing which comprises mixing metal particles and a portion of the amount of graphite to be incorporated, adding fibrous material while still mixing, pouring in melted tallow, and then adding the remaining amount of graphite.

In testimony whereof, I have affixed my signature to this specification.

WALTER RAUTENSTRAUCH.